(12) United States Patent
Borovsky

(10) Patent No.: US 8,726,168 B2
(45) Date of Patent: May 13, 2014

(54) SYSTEM AND METHOD FOR HIDING LATENCY IN COMPUTER SOFTWARE

(75) Inventor: Andrew Borovsky, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1370 days.

(21) Appl. No.: 11/294,790

(22) Filed: Dec. 5, 2005

(65) Prior Publication Data

US 2013/0162654 A1 Jun. 27, 2013

Related U.S. Application Data

(60) Provisional application No. 60/633,336, filed on Dec. 4, 2004.

(51) Int. Cl.
*G06F 3/00* (2006.01)
*G06T 13/00* (2011.01)

(52) U.S. Cl.
USPC ........... 715/746; 715/718; 715/740; 345/473; 345/474; 345/475

(58) Field of Classification Search
USPC ........... 715/746, 740, 718; 345/473, 474, 475
See application file for complete search history.

(56) References Cited

U.S. PATENT DOCUMENTS

| 5,353,391 | A  | * | 10/1994 | Cohen et al. ................. 345/619 |
| 5,781,227 | A  | * | 7/1998  | Goode et al. .................... 725/32 |
| 5,818,446 | A  | * | 10/1998 | Bertram et al. ................ 715/746 |
| 6,020,881 | A  | * | 2/2000  | Naughton et al. ............ 715/740 |
| 6,396,500 | B1 | * | 5/2002  | Qureshi et al. ................ 345/473 |
| 2001/0004417 | A1 | * | 6/2001  | Narutoshi et al. .............. 386/52 |
| 2003/0132959 | A1 | * | 7/2003  | Simister et al. .............. 345/746 |
| 2004/0032423 | A1 | * | 2/2004  | Nason et al. ................. 345/746 |

* cited by examiner

*Primary Examiner* — Boris Pesin
*Assistant Examiner* — Matthew Ell
(74) *Attorney, Agent, or Firm* — Wolfe-SBMC

(57) ABSTRACT

A system and method hides latency in the display of a subsequent user interface by animating the exit of the current user interface and animating the entrance of the subsequent user interface, causing continuity in the display of the two user interfaces. During either or both animations, information used to produce the user interface, animation of the entrance of the subsequent user interface, or both may be retrieved or processed or other actions may be performed.

27 Claims, 4 Drawing Sheets

SYSTEM AND METHOD FOR HIDING LATENCY IN COMPUTER SOFTWARE

RELATED APPLICATION

This application claims the benefit of U.S. Provisional Patent Application Ser. No. 60/633,336, entitled, "Method and Apparatus for Hiding Latency in Computer Software" filed on Dec. 4, 2004 by Andrew Borovsky, having the same assignee as the present application, and is incorporated by reference herein in its entirety.

FIELD OF THE INVENTION

The present invention is related to computer software and more specifically to computer software for user interfaces.

BACKGROUND OF THE INVENTION

Computer software can be used by a user to perform operations. For example, a user can use computer software to configure information in a shopping cart using a user interface provided by a web server to the user's web browser. Another example of an operation that can be performed using computer software is the customization of web-enabled computer software. Still another example of an operation that can be performed using computer software is a computation of a graph from millions of data points, the graph having a type selected by the user.

If the operation takes a noticeable amount of time, the user can become impatient with the software. Some computer software displays wait icons (e.g. an hourglass) or other pacifiers to indicate to the user that the changes to the user interface of the software resulting from the operation are being delayed by operation of the software. The pacifier indicates that the software has not stopped, and that the delay is expected. However, the sudden display of a pacifier seems disconnected from the program and can thereby serve to highlight the delay. Delays frustrate users, so the highlighting of the delay makes the situation worse than it would be without the pacifier.

Another problem with conventional user interfaces is that they either try to cram too much information into a screen, leaving a cluttered appearance, or they require the user to juggle between various disjoint user interfaces. For example, to avoid the display of configuration commands on a web based information display, the application producing the display may require a user to click a link.to a configuration page containing a user interface that allows the user to configure the display of the information. The entire display changes to a configuration web page, and the user is unable to see anything else on the page containing the information display. Alternatively, a small pop window may be displayed to allow the user to configure some of the information on the information display, but such pop up window may appear at a location that is inconvenient for the user, and pop up windows can seem very disjoint from the application. The alternative of placing the configuration user interface on the page with the information would clutter the page, and could require some of the information being displayed to be made smaller or omitted to fit the configuration information.

What is needed is a system and method that can mask a latency in an operation of computer software, using a display related to the display of the user interface both before and after the operation, and that can be used to view additional information such as configuration information without requiring additional screen space reserved for the additional information or requiring the user to see an entirely new display of information or requiring the user to use a separate disjoint user interface, but making it easy and convenient to reach the additional information.

SUMMARY OF INVENTION

A system and method masks the latency in certain operation of a computer program by making the user interface being displayed appear to flip around and display its opposite side containing the next user interface when the user requests such operations be performed. Other morphings of one user interface into the next may also be employed. The appearance of motion allows the user to determine that the operation of the program hasn't stopped, and yet the fact that the animation relates to both the current user interface and the subsequent user interface integrates the two and is not disjoint from either.

The system and method can be used to display additional information in place of some or all of the information being previously displayed, allowing the user to view additional information such as configuration information in a convenient fashion, for example, when the user presses a user interface element such as a button in a user interface containing all or less than all of the information the user is viewing on the display screen. The display of information in the portion of the display screen containing the user interface element smoothly changes to the configuration user interface or user interface containing other additional information, allowing the user access to the configuration user interface or other additional information, which may be related to the information formerly displayed, in the portion of the screen containing the user interface element used to cause the change, without requiring the user to use a disjoint user interface or cease the display of the other information displayed on the user's display screen. The configuration user interface or other additional information replaces only the portion, allowing the user continued access to other portions of the display screen other than the portion containing the user interface element, so that the display of the configuration user interface or other additional information does not appear in an unexpected or otherwise inconvenient location. The system and method of the present invention can be used in other applications as well.

DETAILED DESCRIPTION OF A PREFERRED EMBODIMENT

Figure 1:
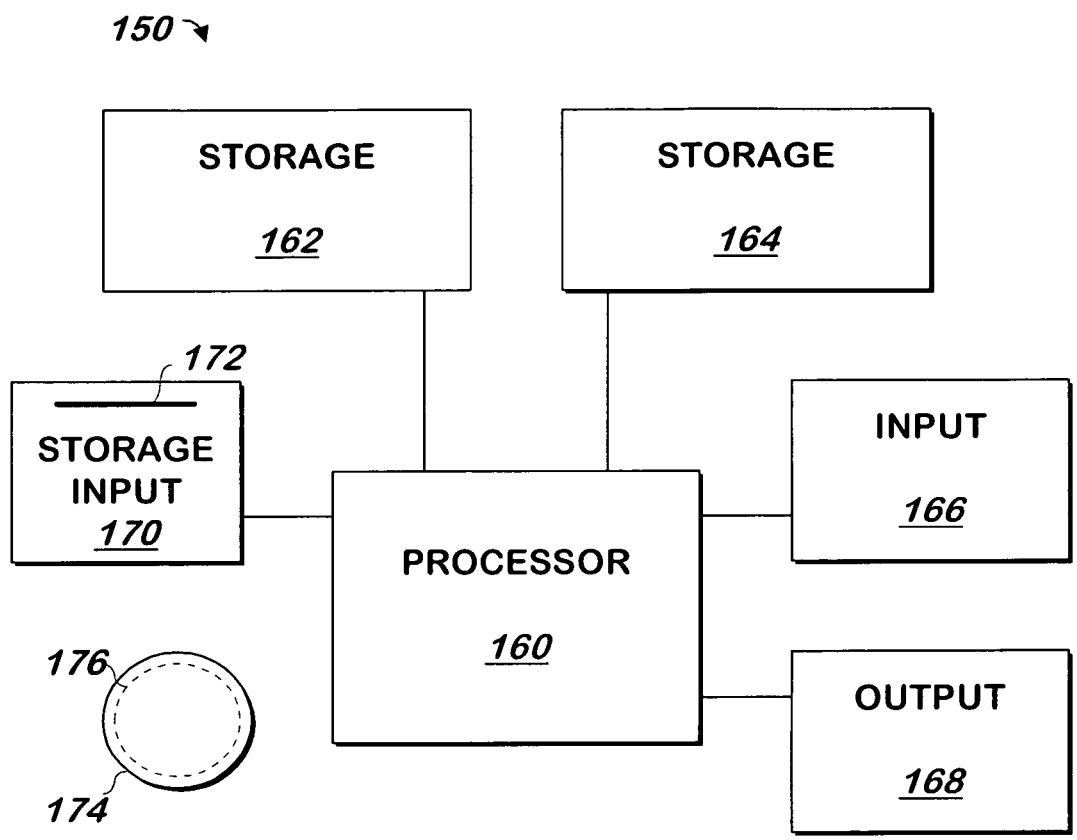
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Overview and Variations.

The present invention allows a user to view a first (i.e. "current") user interface, and then take some action that will cause a second (i.e. "subsequent") user interface to be displayed following the first user interface. To cease display of the first user interface, the display of the first user interface, or a user interface that closely approximates the first user interface, is animated. For example, it may be animated to appear to rotate until it is oriented sideways to the user. At that moment, an animation corresponding to the second user interface is displayed in place of the prior animation, for example, by making the second user interface appear to be oriented sideways to the user, and then it is made to appear to rotate in the same direction as the first user interface was rotating, until it is oriented facing the user. In this manner, the second user interface is made to appear on. the back of the first user interface, with the two animations making the two back-to-back user interfaces appearing to "flip around"

During the rotation or other animated display of the first user interface, one or more operations that can be performed to create the second user interface or to perform other functions are performed, with the animation hiding this latency. The second user interface is rotated into view after it is identified, or shortly before it has been fully identified. The two animations have at least approximately consistent features, for example, speed and direction of each rotation, to make the two rotations appear to be part of the same action, thereby tying the first user interface and second user interface to one another.

The latency may be caused by data being uploaded, data being downloaded, both of these operations, or any other one or more operations that are not related to uploading or downloading of data.

The animation that includes the rotation may be produced locally, by the computer system being used by the user, or may be produced by a server and downloaded to the user's computer system.

The first user interface may include a conventional shopping cart and the second user interface can be used to allow the user to configure the number or type of an item in the shopping cart.

Communication Interfaces.

In one embodiment, the user communicates with system 200 via user communication interface 210. User communication interface 210 includes a conventional communication interface suitable for communication with a conventional keyboard, mouse and monitor or other input and/or output devices, which are not shown, but coupled via input/output 208.

In one embodiment, all network communication into or out of system 200 is made via input/output 213 of network communication interface 212 which is coupled to a network such as the Internet or a local area network or both. Network communication interface 212 includes a conventional communication interface that supports TCP/IP, Ethernet and/or other conventional communication protocols.

User Interfaces and Animations

Two user interfaces are described herein, but the present invention will apply to any number of user interfaces. As described below, a first user interface is displayed, and then a second user interface is displayed, with one or more animations of movement in between the display of the two user interfaces. Although two user interfaces are described herein, there may be any number of user interface displayed using the system and method of the present invention. For example, after the second user interface is displayed, a third user interface may be displayed, with one or more animations of movement between them.

There are two animations described herein as being displayed between the user interfaces. One animation is displayed in place of the "current" user interface (the user interface that is displayed before the first animation), but has the appearance of the first user interface rotating out of view until it is oriented sideways to the user. The second animation is displayed immediately after the first animation, and in place of the first animation, and has the appearance of the subsequent user interface (the one displayed after the second animation stops) rotating from a sideways orientation to an orientation facing the user, and is ultimately replaced by the subsequent user interface. However, in other embodiments, any animation that involves the first user interface changing appearance in a relatively smooth (e.g. not disjoint) manner (e.g. morphing) may be used in place of the animation following the current user interface, and an animation that begins with an appearance that is consistent with the end of the prior animation, and that changes appearance in a smooth manner (e.g. morphing) into the second user interface may be used in place of the animation that precedes the subsequent user interface. For example, the first animation may display the first user interface being cropped using a circular cropping into a pinpoint, and the second animation may start out as a pinpoint and open up in a circular shape (e.g. "uncropping") until the second user interface is displayed. Other means of animating the change from one user interface to another, such as sliding, wiping, or fading, may be used by the present invention.

Retrieval of the First User Interface/Animation Manager.

In one embodiment, to use system 200, the user uses browser 220, which is a conventional browser, to download movie file 230, containing first user interface/animation manager 232, first user interface 234 and first user interface rotate out animation 236. In one embodiment, movie file 230 may be a Flash movie file in the .swf format that was authored by the conventional Flash authoring tool or produced using the conventional Flex application server running on server 214, both Flash and Flex being commercially available from Macromedia, Inc. of San Francisco, Calif. In such embodiment, the movie file 230 containing first user interface/animation manager 232 may be downloaded by the browser when the user uses browser 220 to retrieve a web page which references the first movie file 230. Browser 220 downloads the first movie file 230 from. server 214 and stores it into user interface/animation storage 226.

Browser 220 has registered thereto a user interface/animation displayer 222 for that type of file, such as the Flash Player commercially available from Macromedia, Inc. The user interface/animation displayer 222 is registered as handling files having a certain type or extension (e.g. .swf), and when the browser downloads the movie file 230, it will have that type or extension, causing browser 220 to execute user interface/animation displayer 222 and provide that file 230 to it or otherwise make the file available to it. The user interface/animation displayer 222 is capable of displaying movies, such as first movie file 230, and interpreting commands contained in that movie's 230 user interface/animation manager 232. In one embodiment, each user interface/animation manager 232, 242 contains conventional ActionScript commands that the Flash Player interprets. User interface/animation displayer 222 receives the first movie file 230 and begins interpreting commands in first user interface/animation manager 232.

It isn't necessary that movie files are downloaded or arranged in the file as shown in the Figure. For example, in other embodiments, the various user interface/animation managers such as 232 or some or all of the movie files such as 230, are supplied as part of a stored program resident on, or accessible to, the computer system containing user communication interface 210. An application 213 may be used in place of, or in addition to, network communication interface 212 and server 214, to perform other functions or supply information displayed in the various user interfaces such as 234 or to supply information application 213 displays in other areas of the display screen. In such embodiment, browser 220 need not be used.

Identification and Optional Retrieval of the First User Interface.

First user interface/animation manager 232 causes user interface/animation manager 222 to display the first user interface 234. To cause the display of the first user interface, first user interface/animation manager 232 identifies the first user interface 234.

In one embodiment, first user interface/animation manager 232 identifies the first user interface 234 automatically, upon startup, or in response to one or more user actions, such as user input to one or more fields, a mouse click over a button or other user interface control, received via input/output 208 of user communication interface 210, and optionally via an operating system (not shown). First user interface/animation manager 232 may identify the first user interface 234 in response to an event, such as an operating system timer elapsing.

When first user interface/animation manager 232 has identified the first user interface, it optionally causes browser 220 to retrieve the first user interface, if it was not already retrieved as part of the first movie file 230. As used herein, a "user interface" is a static display of one or more user interface elements with which a user can interact. An "animation" is a series of frames, or information that can be rendered into a series of frames using conventional animation techniques, such frames causing the appearance of a user interface either morphing into another form, or an animation of another form morphing into a user interface. Although these distinctions are made, in one embodiment, a user interface is a single frame animation, which may be the last frame or the first frame of one of the animations described herein.

In one embodiment, if not already stored in user interface/animation storage 226, first user interface/animation manager 232 causes browser 220 to retrieve the user interface it identifies from server 214 via network communication interface 212. Browser 220 stores the user interface 234 it retrieves in user interface/animation storage 226.

First user interface/animation manager 232 provides to user interface/animation displayer 222 an identifier, such as a URL and filename or other identifier, of the first user interface it identified as described above and a command to display the first user interface 234.

Displaying the First User Interface

User interface/animation displayer 222 receives the identifier of the first user interface 234 as described above and displays on the display screen, via user communication interface 210, the first user interface 234 corresponding thereto. In one embodiment, the first user interface 234 is a Flash movie clip that includes one or more user interface elements to be displayed as the first user interface. The user interface elements may include conventional user interface elements, such as buttons, text boxes, pull down boxes, text, graphics and other conventional user interface elements that may display information to the user and/or receive information from the user. In one embodiment, a user interface such as first user interface 234 is a series of definitions of the various elements that make up the user interface, and will be displayed as those elements by user interface/animation displayer 222.

The user can interact with the user interface elements, and then press a button or otherwise indicate an operation that causes the first user interface to stop being displayed, and another user interface to be displayed in its place. In one embodiment, the user need not provide any such indication: the indication is provided by an event, such as an operating system timer.

First user interface/animation manager 232 receives the indication (for example, via user communication interface 210, an operating system, and user interface/animation displayer 222) and causes user interface/animation displayer 222 to display the first user interface rotate out animation 236, by providing an identifier of first user interface rotate out animation 236 to user interface/animation displayer 222.

First user interface rotate out animation 236 will be resident in user interface animation storage 226, either because it was downloaded from server 214 before it was used (for example, as part of the movie file containing first user interface/animation manager 232, downloaded as described above), or was otherwise resident in user interface animation storage 226. In one embodiment, first user interface rotate out animation 236 is part of the first movie file 230, and is downloaded with it. However, it may be arranged later in the file to allow it to be downloaded while the first user interface 234 is being displayed if user interface/animation displayer 222 can display earlier portions of the file while the.later portions are still being downloaded.

User Interface Rotate Out Animation.

As noted above, the animations used herein either rotate out a user interface or rotate in a user interface, but other animations of the user interfaces may be employed. First user interface rotate out animation 236 contains an animation of the first user interface rotating out.

Figure 2:
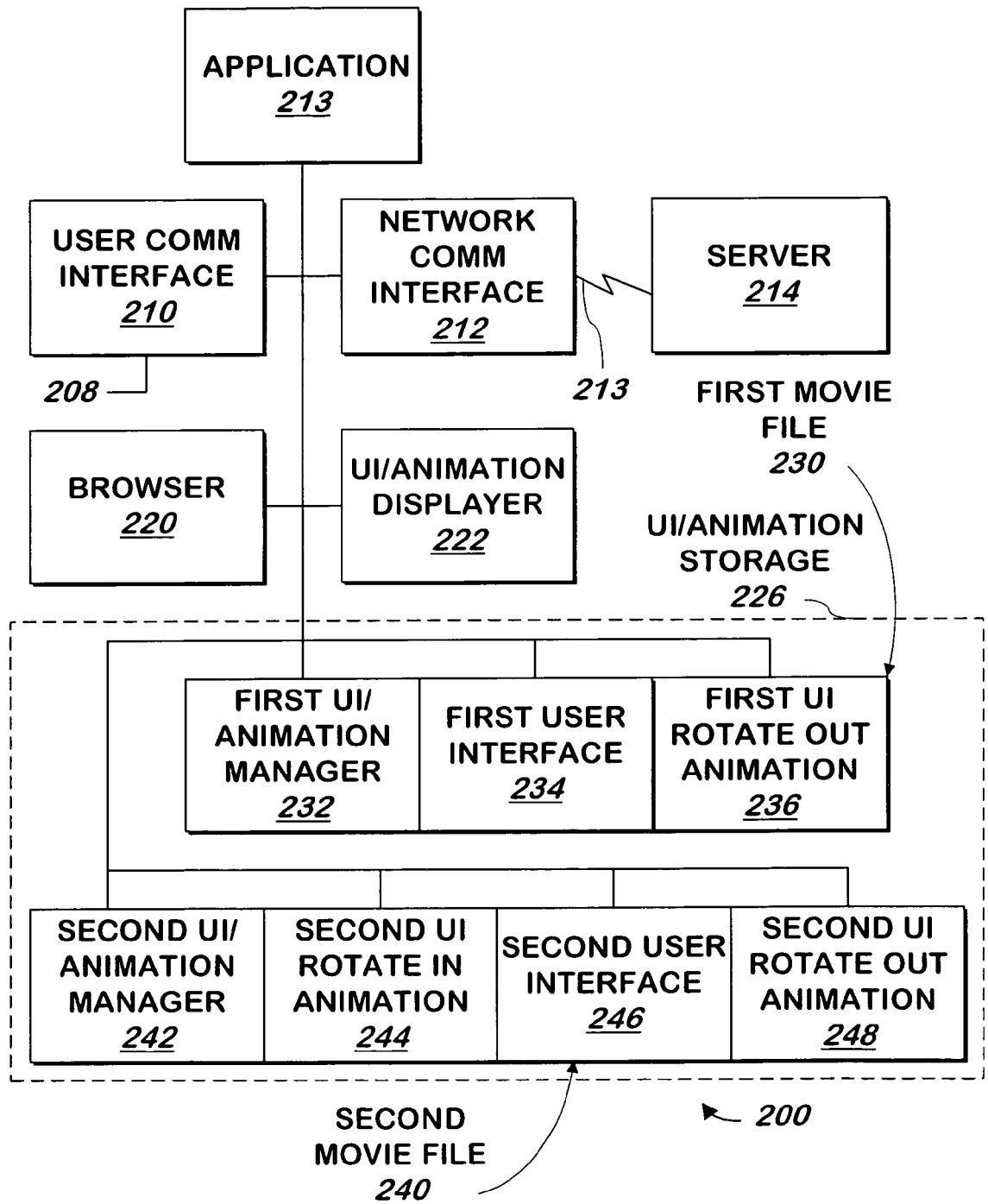
FIG. 2 is a block schematic diagram of a system for displaying user interfaces according to one embodiment of the present invention.
Figure 3A:
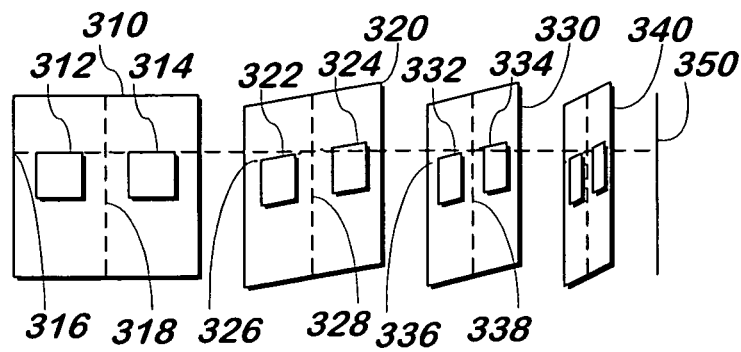
FIG. 3A is an illustration of a first user interface and selected frames of an animation showing the first user interface rotating out according to one embodiment of the present invention.

A sample first user interface as it may appear on the user's display screen, and four frames from a representative first user interface rotate out animation corresponding to the first user interface as they may appear on the user's display screen are shown in FIG. 3A. Referring now to FIGS. 2 and 3A, the first user interface is shown with border 310 and the frames in the animation each contain a different border 320, 330, 340, 350. The first user interface 310 contains two user interface elements 312, 314 represented by boxes. The user interface elements 312 and 314 can be any conventional user interface element of any shape and there may be any number of such elements 312, 314 in other first user interfaces. The first user interface has an axis 316 along its center and the tops of the user interface elements 312, 314 abut a line 314, neither of which may be visible to the user, but are illustrated by the dashed lines in FIG. 3A.

Frame 320 is one of the early frames in the first user interface rotate out animation 236. The right and left edges of the border 320 are narrower than the border 310 of the first user interface and the top and bottom edges of the frame are skewed about the axis 328 which is in the same relative position of axis 318. (The borders 310, 320, 340, 350, 360 are shown adjacent to one another, but they are shown using the x-axis to represent time: in actuality, they would be occupying the same general physical space on the user's display screen as one another, with each displayed at a different point in time).

Elements 322 and 324 represent elements 312 and 314 in the frame containing border 320 in the animation, and are skewed in the same manner as the border of the first user interface, and have their tops positioned in a line 326 that is parallel to the top of the border 320 (in the case of a square border), and has its midpoint intersecting the axis 328 at the same location as line 316 intersects axis 318.

In the frame containing border 330, the border 330 and elements 332, 334 are further narrowed and skewed in the same manner as described above. In the frame containing border 340, the border 340 and user interface elements is still further narrowed and skewed in the same manner. In the frame containing border 350, the user interface elements are not visible and only one edge of the border 350 is visible. It isn't necessary that the last frame show this extreme of a view, and in other embodiments, the last frame shows two or more edges of the border 350 and may even show the user interface elements.

It isn't necessary to skew the tops and bottoms of the borders, or the lines 326, 336 to which the user interface elements are positioned. In one embodiment, the rotate out animation is performed by collapsing the edges of the border and the user interface elements towards the axis 318. Rotate in animations, described below, are performed by expanding the edges of the border and the user interface elements outward from the axis 318.

Generating the Animations.

As noted above, the first user interface rotate out animation 236 may be part of the Flash movie clip, or a different Flash movie clip in the Flash movie that contains the first user interface 234, in which case first animation displayer 240 displays the animation by merely displaying a pre-supplied animation. In another embodiment, the Flash movie clip containing the animation does not actually contain the various frames illustrating the animation, but merely contains instructions on how to animate the border 310 and. elements 312, 314 and optionally other items contained in the first user interface 234 and user interface/animation displayer 222 creates the first animation using the definitions contained in the first user interface 234 and the instructions contained in the first user interface rotate out animation. Other animations described herein may be produced in either of these manners.

Retrieving the Second User Interface Rotate In Animation

As, or shortly after, it causes the display of the first user interface rotate out animation 236, first user interface/animation manager 232 identifies an animation that will follow the first animation and/or initiates the retrieval of it from server 214 by browser 220 or user interface/animation displayer 222, which perform such retrieval of the animation 244 or the movie file 240 containing it and stores it into user interface/animation storage 226. Identifying and/or retrieving the second animation may include sending and/or causing browser 220 or user interface/animation displayer 220 to send, a request for that animation or for the movie file containing that animation, to server 214, user interface/animation displayer, or both, the request identifying any or all of the first user interface, the second user interface, some or all of the contents of the user interface elements 312, 314 the user selected or entered using the first user interface 234, and/or some or all of the contents of the user interface elements the user selected or altered on a user interface displayed prior to the display of the current (e.g. first) user interface, and/or any other information. In one embodiment, such animation being so identified is an animation of a user interface that will be displayed subsequent to the first user interface, rotating in, contained or described or referenced in second user interface rotate in animation 244.

In one embodiment, second user interface rotate in animation 244 is contained in a second movie file 240 that contains the second user interface 246, a second user interface rotate out animation 248, described in more detail below, and a second user interface/animation manager 242 that contains instructions regarding the operation of the second user interface 246 and the animations 244, 248. Browser 220 or user interface/animation displayer 222 requests and retrieves the second movie file 240 from server 214 via the request described above, and again provides it to user interface/animation displayer 222 in accordance with the type or extension of the second movie file 240. As noted herein, the browser 220 requests and receives the files or other information, however, user interface/animation displayer 222 may request and receive such information from server 214 in response to requests from the various user interface/animation managers described herein, without the use of browser 220.

Server 214 uses the information contained in the request to provide the animation, user interface or movie file requested and provides it to network communication interface 212, which routes it to the entity that made the original request, such as browser 220 or user interface/animation displayer 222, which stores the information or file into user interface/animation storage 226. If browser 220 makes the request, it provides a handle or other identifier of the file to user interface/animation displayer 222.

In one embodiment, the animations and user interfaces may be provided by server 214 as described herein by selecting predefined versions of them from a storage area accessible to server 214 in response to the requests it receives. In another embodiment, server 214 generates and provides to first user interface/animation manager 220 the various animations and user interfaces, and the corresponding user interface/animation manager, in response to the request made by first user interface/animation manager 220. The request may contain information that server can use to generate the above items, such as conventional parameters placed into the request, such as to the right of the URL and a question mark. The information may contain information entered by the user into the first user interface or a prior user interface. Server 214 may retrieve some of the information used to build the animations and/or user interfaces, and then alter it in accordance with information received from the user or other information accessible to the server 214 or server 214 may programatically build the entire movie file, animation, user interface or user interface/animation manager and provide it to browser 220 via network communication interface 212.

Although the present invention describes the retrieval of the second user interface rotate in animation 244 during the time the first user interface rotate out animation 236 is being displayed, other operations may be performed during the display of the first user interface rotate out animation 236. These operations may be other operations that are used to identify or produce the second user interface and/or it's rotate in animation.

In one embodiment, the amount of time the various animations described herein are programmed to take to fully display them corresponds to the expected amount of time the operations necessary to obtain the subsequent user interface or one or more of its corresponding animations. For example, the animation displayed to a user using a high speed Internet connection can be displayed in a shorter amount of time than the same animation would be displayed to the user using a dial up connection. Server 214 or the animation manager 232 (or 242) managing the animation detects, using conventional techniques, the speed of the connection, processor or other device that affects the speed of operations and adjusts the speed at which user interface/animation displayer 222 will display the animation accordingly.

As or after the second user interface rotate in animation is retrieved, at the end of the display of the first animation, first user interface/animation manager 220 is signaled by user interface/animation displayer 222. At such time, first user interface/animation manager 220 signals second user interface/animation manager 242.

In one embodiment, second user interface/animation manager 242 is part of a program containing first user interface/animation manager 232 or they 242 and 232 are one in the same. In another embodiment, shown in the Figure, second user interface/animation manager 242 is part of the second movie file 240 containing the second user interface rotate in animation 244 and they are retrieved around the same time from the server 214 as described above.

When signaled, second user interface/animation manager 242 provides an identifier of the second user interface rotate in animation 244 to user interface/animation displayer 222 and an indication to display the second user interface rotate in animation. The identifier of the second user interface rotate in animation may be provided to second user interface/animation manager 242 by first user interface/animation manager 232 or it may be determined by second user interface/animation manager 242 either being hardcoded in it or identified by it, optionally via information the user entered into the first user interface, and such information may be provided by first user interface/animation manager 232 to second user interface animation manager 242 at the time it 232 provides the signal as described above.

When it receives the identifier of the second user interface rotate in animation 244, user interface/animation displayer 222 displays the second animation.

In one embodiment, second user interface rotate in animation 244 may refer to the second user interface 246 or an identifier of the second user interface 246 may be identified and provided to user interface/animation displayer 222 by second user interface/animation manager 242 using the same or similar technique as was described for identifying the second user interface rotate in animation 244. In this embodiment, user interface/ animation displayer 222 generates the animation using instructions in second user interface rotate in animation 244 and the definitions of the second user interface contained in second user interface 246.

Figure 3B:
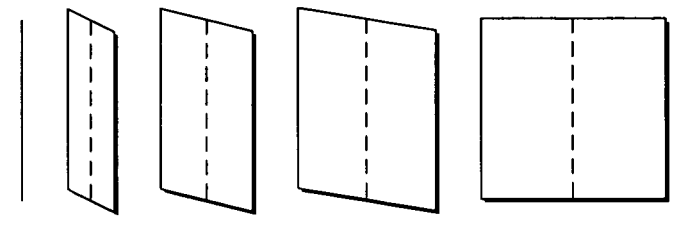
FIG. 3B is an illustration of selected frames of an animation showing a second user interface rotating in and a second user interface according to one embodiment of the present invention.

When displayed to a user, the second user interface rotate in animation provides an animation of rotation from a side view (or nearly side view) of a second user interface, described below, to a front view (or nearly front view) of the second user interface. The means of animation is the opposite of that described with respect to the rotate out animation shown in FIG. 3A, whereby user interface elements and any borders are unskewed and the distance between right and left edges expanded from one animation frame to the next until the last frame has the appearance, or nearly the appearance of the second user interface. However, in one embodiment, the direction of skew for a rotate in animation is opposite of the rotate out animation illustrated in FIG. 3A to provide the appearance of a continuous motion in the same direction between the rotate out animation and the next rotate in animation. Selected frames of a representative second user interface rotate in animation and the second user interface (shown on the far right) are shown in FIG. 3B in the order in which those frames are displayed, along the x-axis. Other frames may be displayed between the frames shown to cause the second user interface rotate in animation to have a smooth-motion appearance.

In one embodiment, the frames of the second user interface rotate in animation 244 are downloaded in the order in which they appear, or in another manner that will allow the playback of the second animation to begin before all of the frames of the second user interface rotate in animation 244 have been retrieved from the server 214.

Display of the Second User Interface.

When user interface/animation displayer 222 completes displaying the second animation, it signals second user interface/animation manager 242, which provides an identifier of the second user interface 246 to user interface/animation displayer 222 or the second user interface may be the last frame in the second user interface rotate in animation, which second user interface animation manager 242 directs user interface/animation manager 222 to steadily display. The second user interface may be any conventional user interface, containing user interface elements described above with respect to the first user interface, except that the second user interface is different from the first user interface. The elements of the second user interface have an appearance that is similar or identical to the last (or nearly last) frame of the second user interface rotate in animation so that it appears to be the last frame in the animation, in the same manner that the frame containing border 312 was similar to the earlier frames in the first animation. User interface/animation displayer 222 renders and displays the second user interface 246 in place of the second user interface rotate in animation.

The user can then interact with the second user interface as rendered by user interface/animation displayer 222 including any of the elements of the second user interface, using any conventional technique. The user may then perform an action that causes a different user interface to be displayed. The different user interface may be identical to (and in fact, the same as) the first user interface, or similar to the first user interface, though it may be somewhat altered in a manner that is consistent with the user's actions performed via the second user interface. When the user performs the action that causes the different user interface to be displayed, second user interface/animation manager 242 is signaled (via user communication interface 210, operating system (not shown), and user interface/animation displayer 222), and it signals user interface/animation displayer 222 with an identifier of second user interface rotate out animation 248 to display. Second user interface rotate out animation 248 either contains frames, or instructions describing how to produce frames, in an animation that user interface/animation displayer 222 displays in place of the second user interface and makes the second user interface appear to rotate away from the user in the same manner that first user interface rotate out animation 236 made the first user interface appear to rotate away from the user as shown in FIG. 3A.

Display of the Second User Interface Rotate Out Animation.

User interface/animation displayer 236 displays the second user interface rotate out animation 248. Second user interface rotate out animation 248 may have been retrieved with the second user interface 246, and may be part of the same file 240, though it may appear later in that file 240 to allow it to be downloaded after the other portions of file 240. For example, the second user interface rotate out animation 248 may be a movie clip in the same movie file 240 as the second user interface rotate in animation 244 and the second user interface, with none, some, or all of second user interface/animation manager 242 being a part of the same movie file 240. If second user interface rotate out animation 248 is not downloaded with the file or otherwise available second user interface/animation manager 242 identifies it and retrieves it in the manner described herein for other identifications and retrievals.

Other Subsequent Displays

During the display of the second user interface rotate out animation 248, second user interface/animation manager 242 may identify and cause the retrieval of another animation or movie file in the same manner that first user interface/animation manager 232 identified and caused the retrieval of the second movie file or second user interface rotate in animation 244 as described above. In the event that the subsequent user interface could be the first user interface, the first movie file 230 may have a first user interface rotate in animation included with it to allow it to be played back and cause the appearance of the first user interface to rotate into view in the same manner that the second user interface rotate in animation causes the appearance of the second user interface to appear to rotate into view. If the first user interface will be changed, either second user interface/animation manager 242 can provide the information required for such change to first user interface animation manager 232 or second user interface/animation manager 242 can identify and initiate the download of a new version of the first movie file 230 from the server in the manner files are downloaded as described above. As noted, such file will also have a first user interface rotate in animation, and will be processed in the same manner described above with respect to the second movie file 240. This technique may also be used to identify, optionally download, and process any number of other movie files, in a manner similar to the identification, optional downloading, and processing of the second movie file as described above.

As the user views or interacts with any of the user interfaces 234, 246, the user interface 234 or 246 may change appearance, either because the user has changed the appearance of the user interface directly, such as by entering data into a text box. Any user interface 234, 246 may also have its appearance changed in response to events that are not strictly user initiated, such as a timer elapsing, as defined by that user interface and displayed by user interface/animation displayer 222.

As noted, in one embodiment, the animation that is displayed immediately following a user interface is defined in terms of the objects that may appear on that user interface immediately before the subsequent animation is displayed, so that the animation displayed immediately following a user interface appears to be that user interface rotating out of view. This allows the animation of the user interface rotating out of view to include any changes made to the user interface, either by the user or by the user interface/animation displayer 230, 250 displaying the user interface.

Although only two user interfaces and two movie files are shown in the Figure, there may be any number of user interfaces and/or movie files, each rotating out with the subsequent user interface rotating in. As noted, other ways of morphing the user interfaces other that rotations may be used by the present invention.

Shopping Cart.

In one embodiment, one such user interface contains a conventional shopping cart, showing or listing one or more items that have been added to the cart. If the user selects any one of the items and clicks a "change" user interface control such as a button on the first user interface, the second user interface allows the configuration of that item (e.g. color, size, pattern and the like) or a change in the quantity of that item to be ordered or both. From the second user interface, the user can make the change and then press a "submit" user interface control such as a button on the second user interface, the changes made are uploaded to server 214, and the first user interface is displayed, indicating the changes the user has made, for example, showing a picture of the item with the color changed using the second user interface, and the user's shopping cart is altered as indicated by the user using the second user interface. The rotate out and rotate in animations described herein are displayed in between the display of each of the first and second user interfaces to hide the latency of the upload or download, which are performed during the display of the rotate out animations as described above. During the download of the second user interface, the options from which the user can select to make the changes may be downloaded for use in the display of the second user interface to the user, with his or her current selections displayed as the default selections in the second user interface.

Method.

Figure 4:
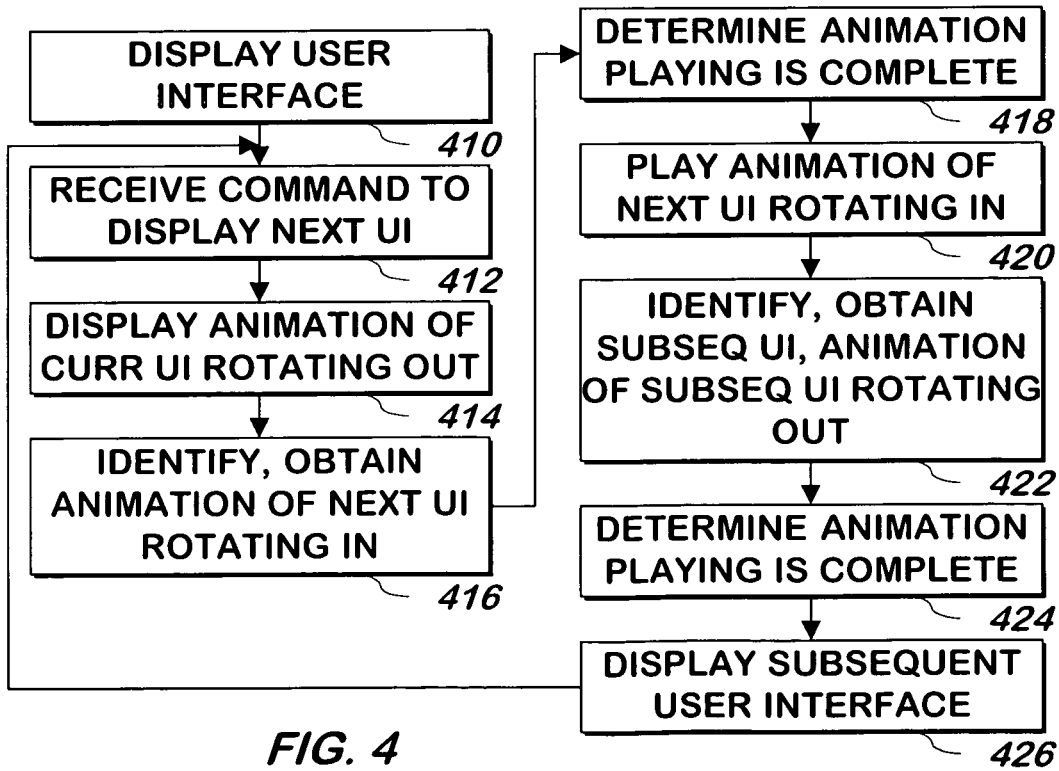
FIG. 4 is a flowchart illustrating a method of displaying user interfaces according to one embodiment of the present invention.

Referring now to FIG. 4, a method of displaying multiple user interfaces is shown according to one embodiment of the present invention. A user interface is displayed 410 as described above. A command or other indication is received or identified to display a subsequent user interface 412 as described above. An animation of the current user interface rotating out (or other animation related to the current user interface displayed before the animation) is displayed 414 as described above. During the performance of step 414, other actions may be performed, such as step 416, which identifies and/or obtains an animation of the subsequent user interface rotating into view as described above. Step 416 may be performed by downloading the animation, downloading the subsequent user interface and optionally, instructions regarding its animation, or downloading information that can be used to build such animation, user interface or both, at the user's computer system.

When the animation playing is complete 418, the animation of the subsequent user interface rotating into view (or other animation related to the animation displayed in the prior iteration of step 414 and the subsequent user interface) is displayed 420. Other operations may be performed during the performance of step 420.

The subsequent user interface is identified or obtained 422, either as part of the animation of that user interface.rotating into view, or separately, and this may be done during the performance of one or more other steps, such as step 420. Step 420 (or another step such as step 426 described below) may include identifying and obtaining an animation of the subsequent user interface rotating out, or another animation, so that such animation will be available in time for its display in the next iteration of step 414.

When the display of the animation of the subsequent user interface rotating into view is determined to be complete 424, the subsequent user interface is displayed 426 and becomes the current user interface, and the method continues at step 412.

In one embodiment, the animation of the current user interface rotating out displayed in step 414 of one iteration of the method shown in FIG. 4 may be obtained at any time during or after the performance of step 414 in the prior iteration of the method of FIG. 4 so that this animation is rapidly available.

One user interface displayed as described above may be a shopping cart, with a subsequent user interface being a configuration user interface for a selected item in the shopping cart, and the user interface subsequent to that user interface may be an updated shopping cart, as described above.

Example

Figure 5A:
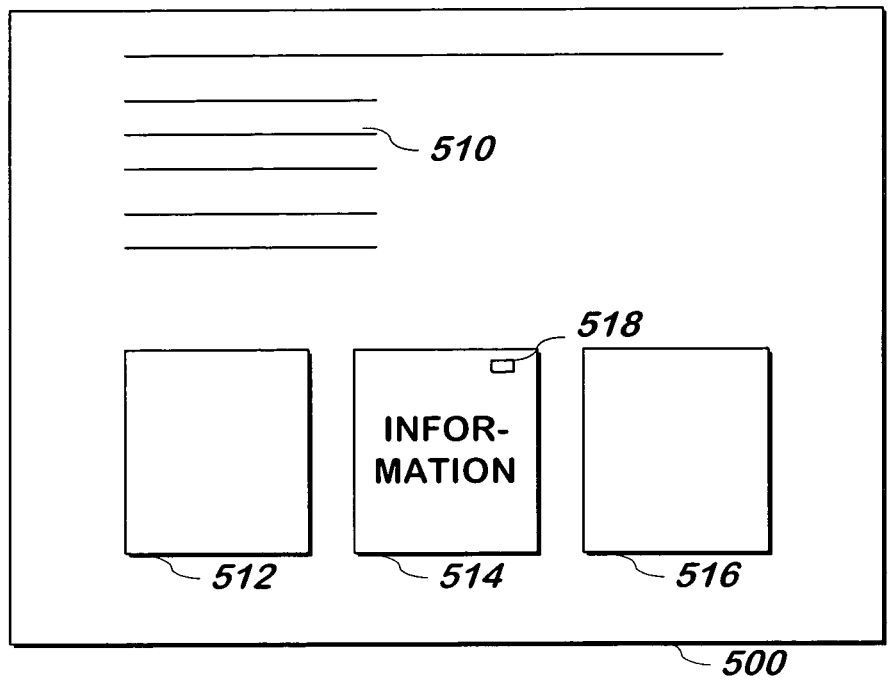
FIG. 5A is an illustration of a user interface displayed on a display screen according to one embodiment of the present invention.
Figure 5B:
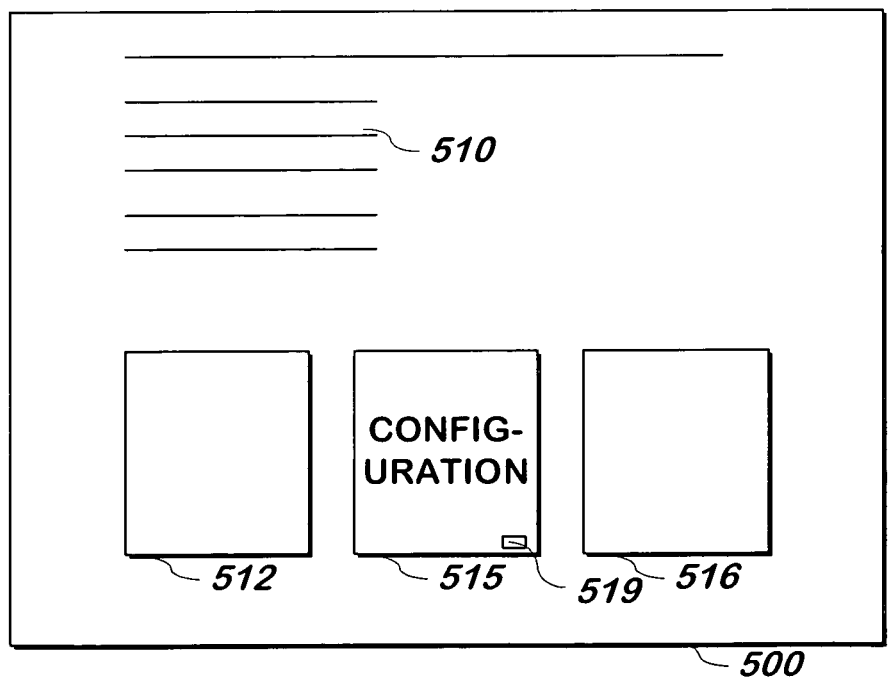
FIG. 5B is an illustration of a user interface displayed on a display screen according to one embodiment of the present invention.

FIGS. 5A and 5B are illustrations of a display screen 500 at different times as will now be described. FIG. 5B shows a display screen 500 displaying information 510 on the screen and three user interfaces 512, 514, 516 that display the same or other information. The information 510 and information displayed in user interfaces 512, 514, 516 may be related to one another or may be unrelated to one another. A button 518 in user interface 514 allows a user to view a user interface that can be used to configure the information in that user interface 514. Configuring the information may include providing instructions regarding changing the information or type of information provided, changing the manner in which the information is displayed or both.

When the user clicks the button 518, that user interface 514 appears to flip around or otherwise change as described above, to reveal a configuration user interface 515 that contains user interface elements the user can use to configure the information that will be displayed in user interface 514 or another user interface that replaces it. The screen 500 will then appear as shown in FIG. 5B. When the user has completed using user interface 515 to configure the display of information in user interface 514, the user clicks user interface element 519 of user interface 515. User interface element 515 appears to flip around or otherwise changes to reveal user interface 514 or another user interface that replaces it in the screen 500, and the user interface 514 or its replacement displays the information as configured using user interface 515. As user interface element 515 flips around, the changes can either be either uploaded to server 214 or application 213, which provides the new version of user interface 514 or the new user interface that replaces it, for example by building a new movie file or modifying the one used to previously display user interface element 514. The changes may instead or in addition be provided from the user interface/animation manager that manages the display of user interface 515 to the user interface/animation manager that manages the display of user interface 514. The screen 500 will then appear as shown in FIG. 5A, with the information provided in user interface element 514 or a different user interface that replaces it altered or configured in accordance with the user's changes, if any. These techniques may be used with the system of FIG. 2 or the method of FIG. 4.

As the screen changes from that shown in FIG. 5A to that shown in FIG. 5B and back, the other information 510 and other user interfaces 512, 516 need not change, allowing an consistent look to the remainder of the screen 510 other than user interface 514. The space used to display the user interface 514 is thus used to display additional information at a different time, but the user interfaces 514, 515 are displayed in a continuous fashion, without displaying a disjoint user interface such as a pop up window. To make the changes in configuration, the user can use the control 518 on the user interface 514 being altered, allowing the user to point with a pointing device such as a mouse at the user interface 514 corresponding to the desired change, rather than a menu item or other user interface element at the top or other part of the screen.

What is claimed is:

1. A method of displaying a first user interface and a second user interface related to the first user interface, the method comprising:

displaying the first user interface, the first user interface including a selectable interface element that, when selected, effects a display of the second user interface;

in response to a user selection of the selectable element, displaying a first latency-masking animation of the first user interface that is visually related to the first user interface initially, and visually related to a second latency-masking animation of the second user interface at least near the end of the first animation, substantially in place of the first user interface, the first animation at least mostly ceasing to appear over time;

performing operations during the display of at least part of the first animation, the operations including receiving the second user interface and the second animation via a download over a network, the received second animation of the second user interface generated based on information associated with the first user interface including information input to the first user interface, at least the receiving having an expected resource-based latency that affects at least the first animation;

displaying the second animation following the display of at least a portion of the first animation, the second animation being visually related to the second user interface at least near the end of the second animation, and visually related to the first animation at least initially; and displaying the second user interface following at least a portion of the display of the second animation.

2. The method of claim 1, wherein the first animation appears as though the first user interface is rotating from a substantially front-facing view to a substantially side-facing view.

3. The method of claim 2, wherein the first user interface appears to rotate in the first animation by:
increasingly skewing over time, at least one horizontal element of the first user interface; and
increasingly narrowing over time, at least one width between at least two vertical elements of the first user interface.

4. The method of claim 2, wherein:
the first animation has a direction of rotation and ends at a height and a position;
the second animation starts with a height and position substantially at the height and position of the first animation; and
the second animation appears as though the second user interface is rotating from a substantially side-facing view to a substantially front-facing view.

5. The method of claim 1, wherein the first animation and the second animation have a combined duration at least corresponding to the expected latency to mask the expected latency.

6. The method of claim 5, wherein the expected latency is determined at least partly based on detected network connection and processing speeds.

7. The method of claim 1, wherein the operations performed during the display of at least part of the first animation visually related to the first user interface include uploading data entered through the first user interface to a data processing component that configures the second user interface in accordance with the uploaded data, the uploading causing the expected resource-based latency; and
wherein displaying the second user interface comprises displaying a user interface that is configured in accordance with the uploaded data.

8. The method of claim 1, wherein
displaying the first user interface comprises displaying a shopping cart interface presenting at least one selected item;
receiving the second user interface comprises downloading a configuration control interface that presents options for configuring the at least one selected item, the expected resource-based latency being associated with the downloading; and
the first and second latency-masking animations have a duration at least corresponding to the expected latency associated with the downloading, so as to mask the expected latency.

9. The method of claim 1, wherein the second user interface presents options for configuring items displayed in the first user interface, and wherein the method further comprises:
in response to a command to submit configuration information input to the second user interface, displaying a third latency-masking animation of the second user interface, the third animation received during the display of at least part of the first animation;
during the display of at least a part of the third animation, uploading the configuration information to a data processing component and receiving an updated version of the first user interface that reflects the uploaded configuration information; and
displaying the received updated version of the first user interface in place of the second user interface,
wherein at least one of the uploading of the configuration information and the receiving of the updated version of the first user interface has an expected resource-based latency that affects at least the third latency-masking animation.

10. A computer program product comprising a computer useable medium having computer readable program code embodied therein for displaying a first user interface and a second user interface related to the first user interface, the computer program product comprising computer readable program code devices configured to cause a computer system to:
display the first user interface, the first user interface including a selectable interface element that, when selected, effects a display of the second user interface;
in response to a user selection of the selectable element, display a first latency-masking animation of the first user interface that is visually related to the first user interface initially, and
visually related to a second latency-masking animation of the second user interface at least near the end of the first animation, substantially in place of the first user interface, the first animation at least mostly ceasing to appear over time;
perform operations during the display of at least part of the first animation, the operations including receiving the second user interface and the second animation via a download over a network, the received second animation of the second user interface generated based on information associated with the first user interface including information input to the first user interface, at least the receiving having an expected resource-based latency that affects at least the first animation;
display the second animation following the display of at least a portion of the first animation, the second animation being visually related to the second user interface at least near the end of the second animation, and visually related to the first animation at least initially; and
display the second user interface following at least a portion of the display of the second animation.

11. The computer program product of claim 10, wherein the first animation appears as though the first user interface is rotating from a substantially front-facing view to a substantially side-facing view.

12. The computer program product of claim 11, wherein the first user interface appears to rotate in the first animation by:
increasingly skewing over time, at least one horizontal element of the first user interface; and
increasingly narrowing over time, at least one width between at least two vertical elements of the first user interface.

13. The computer program product of claim 11, wherein:
the first animation has a direction of rotation and ends at a height and a position;
the second animation starts with a height and position substantially at the height and position of the first animation; and
the second animation appears as though the second user interface is rotating from a substantially side-facing view to a substantially front-facing view.

14. The computer program product of claim 10, wherein the first animation and the second animation have a combined duration at least corresponding to the expected latency to mask the expected latency.

15. The computer program product of claim 14, wherein the expected latency is determined at least partly based on detected network connection and processing speeds.

16. The computer program product of claim 10, wherein the operations performed during the display of at least part of the first animation visually related to the first user interface include uploading data entered through the first user interface to a data processing component that configures the second user interface in accordance with the uploaded data, the uploading causing the expected resource-based latency; and wherein the second user interface comprises a user interface that is configured in accordance with the uploaded data.

17. The computer program product of claim 10, wherein:
the first user interface comprises a shopping cart interface presenting at least one selected item;
receiving the second user interface comprises downloading a configuration control interface that presents options for configuring the at least one selected item, the expected resource-based latency being associated with the downloading; and
the first and second latency-masking animations have a duration at least corresponding to the expected latency associated with the downloading, so as to mask the expected latency.

18. The computer program product of claim 10, wherein the second user interface presents options for configuring items displayed in the first user interface, and wherein the computer program product comprises computer readable program code devices configured to cause a computer system to:
in response to a command to submit configuration information input to the second user interface, display a third latency-masking animation of the second user interface, the third animation received during the display of at least part of the first animation;
during the display of at least a part of the third animation, upload the configuration information to a data processing component and receiving an updated version of the first user interface that reflects the uploaded configuration information; and
display the received updated version of the first user interface in place of the second user interface,
wherein at least one of the uploading of the configuration information and the receiving of the updated version of the first user interface has an expected resource-based latency that affects at least the third latency-masking animation.

19. A system, comprising:
a user interface device; and
at least one processor interacting with the user interface device and performing operations comprising:
displaying a first user interface, the first user interface including a selectable interface element that, when selected, effects a display of a second user interface;
in response to a user selection of the selectable element, displaying a first latency-masking animation of the first user interface that is visually related to the first user interface initially, and visually related to a second latency-masking animation of the second user interface at least near the end of the first animation, substantially in place of the first user interface, the first animation at least mostly ceasing to appear over time;
performing operations during the display of at least part of the first animation, including receiving a second user interface and the second animation, the received second animation of the second user interface generated based on information associated with the first user interface including information input to the first user interface, at least the receiving having an expected resource-based latency that affects at least the first animation displaying the second animation following the display of at least a portion of the first animation, the second animation being visually related to the second user interface at least near the end of the second animation, and visually related to the first animation at least initially; and
displaying the second user interface following at least a portion of the display of the second animation, the second user interface presenting options for configuring items displayed in the first user interface;
in response to a command to submit configuration information input to the second user interface, display a third latency-masking animation of the second user interface, the third animation received during the display of at least part of the first animation;
during the display of at least a part of the third animation, upload the configuration information to a data processing component and receiving an updated version of the first user interface that reflects the uploaded configuration information and in which at least one of the upload of the configuration information and the receiving of the updated version of the first user interface has an expected resource-based latency that affects at least the third latency-masking animation; and
display the received updated version of the first user interface in place of the second user interface.

20. The system of claim 19, wherein the operations performed during the display of at least part of the first animation comprise downloading over a network at least a portion of the second animation and the second user interface.

21. The system of claim 19, wherein the first animation appears as though the first user interface is rotating from a substantially front-facing view to a substantially side-facing view.

22. The system of claim 21, wherein the first user interface appears to rotate in the first animation by:
increasingly skewing over time, at least one horizontal element of the first user interface; and
increasingly narrowing over time, at least one width between at least two vertical elements of the first user interface.

23. The system of claim 21, wherein:
the first animation has a direction of rotation and ends at a height and a position;
the second animation starts with a height and position substantially at the height and position of the first animation; and
the second animation appears as though the second user interface is rotating from a substantially side-facing view to a substantially front-facing view.

24. The system of claim 19, wherein the first animation and the second animation have a combined duration at least corresponding to the expected latency to mask the expected latency.

25. The system of claim 24, wherein the expected latency is determined at least partly based on detected network connection and processing speeds.

26. The system of claim 19, wherein the operations performed during the display of at least part of the first animation visually related to the first user interface include uploading data entered through the first user interface to a data processing component that configures the second user interface in accordance with the uploaded data, the uploading causing the expected resource-based latency; and wherein the second user interface comprises a user interface that is configured in accordance with the uploaded data.

27. The system of claim 19, wherein:

the first user interface comprises a shopping cart interface presenting at least one selected receiving the second user interface comprises downloading a configuration control interface that presents options for configuring the at least one selected item, the expected resource-based latency being associated with the downloading; and the first and second latency-masking animations have a duration at least corresponding to the expected latency associated with the downloading, so as to mask the expected latency.

\* \* \* \* \*